United States Patent [19]
Brooks et al.

[11] Patent Number: 5,987,918
[45] Date of Patent: Nov. 23, 1999

[54] METHOD OF SEPARATING NITROGEN FROM AIR

[75] Inventors: Charles Brooks, North Plainfield; Karl O. Toppel, Flemington, both of N.J.

[73] Assignee: The BOC Group, Inc., New Providence, N.J.

[21] Appl. No.: 09/040,095

[22] Filed: Mar. 17, 1998

[51] Int. Cl.[6] .................................................. F25J 1/00

[52] U.S. Cl. .............................................. 62/643; 62/913

[58] Field of Search ............................... 62/641, 643, 913

[56] References Cited

U.S. PATENT DOCUMENTS

| | | | |
|---|---|---|---|
| 2,959,021 | 11/1960 | Grenier | 62/913 |
| 3,364,686 | 1/1968 | Becker | 62/641 |
| 4,092,131 | 5/1978 | Rohde | 62/641 |
| 4,731,102 | 3/1988 | Yoshino | 62/913 |

*Primary Examiner*—Ronald Capossela
*Attorney, Agent, or Firm*—David M. Rosenblum; Salvatore P. Pace

[57] ABSTRACT

A method of separating air in a liquid nitrogen assist plant in which oxygen rich waste stream produced by the plant is used to partially pressurize adsorbent beds in a pre-purification unit operating in accordance with a pressure swing adsorption cycle.

6 Claims, 2 Drawing Sheets

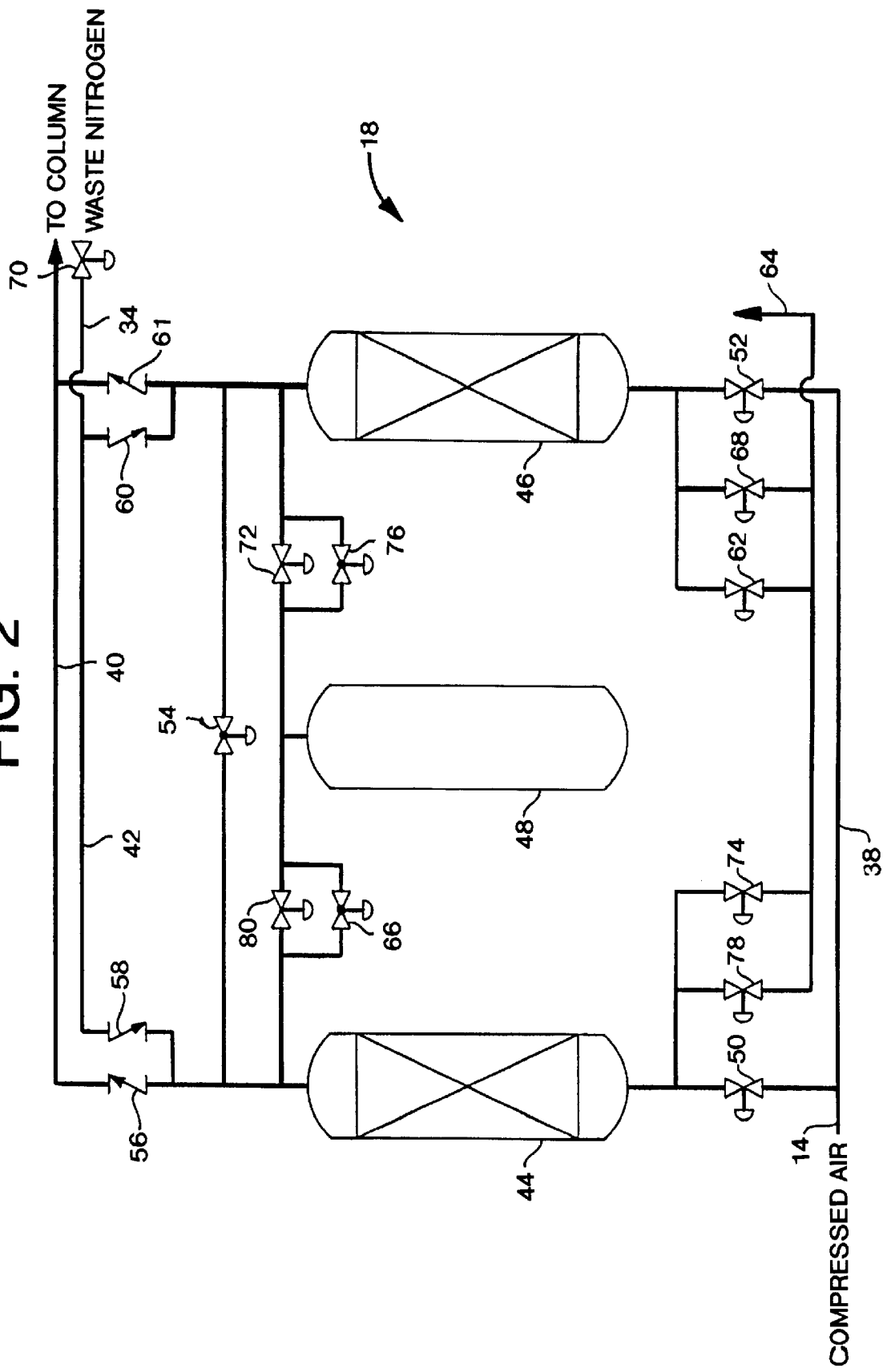

METHOD OF SEPARATING NITROGEN FROM AIR

BACKGROUND OF THE INVENTION

The present invention relates to a method of separating nitrogen from air in which compressed and purified air is separated in a single column and refrigeration is added by a an external liquid stream. More particularly, the present invention relates to such a method in which the column is refluxed by condensing tower overhead against vaporizing liquid column bottoms to produce an oxygen rich waste stream. Even more particularly, the present invention relates to such a method in which the air is purified in adsorbent beds that are regenerated and pressurized in part by the oxygen rich waste stream.

Air is separated by a low temperature rectification process utilizing a single column known as a nitrogen generator. The air is compressed, purified and cooled to near its dewpoint and is then introduced into the distillation column to produce a nitrogen rich tower overhead and an oxygen rich liquid column bottoms. A stream of the column bottoms is expanded and then used as a coolant to condense tower overhead that is in turn used to reflux the column. Refrigeration is added by injecting a liquid stream into the process in order to compensate for warm end losses and heat leakage into the process. Commonly, the refrigeration is added by way of a liquid nitrogen stream injected into the distillation column. An air separation plant utilizing an external source of liquid to provide refrigeration is known in the air as a "liquid assist plant".

In any air separation plant it is necessary for the air to be prepurified so as to remove carbon dioxide and moisture that would otherwise solidify within piping and heat exchange passages within the plant. In air separation plants designed to produce high purity products, it is also necessary to remove other impurities such as carbon monoxide and hydrocarbons.

The necessary prepurification can be effectuated by known prepurification units used in connection with liquid assist plants such as described above. Prepurification units comprise adsorbent beds to adsorb the aforementioned impurities from the incoming air. In order that the plant can continuously be operated, the adsorbent beds are utilized in continuous cycles in which one adsorbent bed functions in an on-line capacity to adsorb the impurities from the air with one or more other adsorbent beds are in an off-line state being regenerated. One major cycle is referred to in the art as pressure swing adsorption in which the beds adsorb at an operating pressure of the plant that is set by the main air compressor and are then regenerated at a lower pressure at which the adsorbed impurities desorb and are expelled from the unit.

Typically the regeneration in a pressure swing adsorption cycle is effected by first venting an adsorbent bed to atmosphere so that the adsorbed impurities desorb from the bed and flow towards the bed inlet. Thereafter, the adsorbent bed is purged with a stream of nitrogen to further desorb the adsorbed impurities. The adsorbent bed is then repressurized with part of the compressed air that has been compressed by the main air compressor. The use of part of the air to be rectified not only represents an increase in the required capacity of the compressor but also an additional energy expenditure beyond that required for the distillation itself.

As will be discussed, the present invention provides a method of separating nitrogen from air in which a liquid assist plant is operated in connection with a pressure swing adsorption, prepurification unit in a more energy efficient manner than the prior art and such that inherently decreases compressor capacity requirements.

SUMMARY OF THE INVENTION

The present invention provides a method of separating nitrogen from air in which the air is compressed to form an air stream. After heat of compression is removed from the air stream, the air stream is purified by removing impurities that comprise carbon dioxide and moisture from the air stream. This produces a compressed and purified air stream. The compressed and purified air stream is introduced into a distillation column configured to separate the air to produce the nitrogen and a waste stream enriched in oxygen. Refrigeration is introduced from an external liquid source. The air stream is purified in a pre-purification unit having at least two adsorbent beds containing an adsorbent to adsorb the impurities. The pre-purification unit is operated by subjecting each of the at least two adsorbent beds to the steps of adsorption to adsorb the impurities from the air stream, thereby to produce a prepurification unit product stream and regeneration to regenerate the adsorbent and to re-pressurize each of the at least two adsorbent beds to an operational pressure of the pre-purification unit. The compressed and purified air stream is formed from at least part of the prepurification unit product steam and each of the at least two adsorbent beds are in part re-pressurized with the waste steam.

The partial repressurization or backfill step with the waste steam has been found by the inventors herein to be an economical way to save power in a liquid nitrogen assist plant having a pre-purification unit operating in accordance a pressure swing adsorption cycle. It is to be noted that this use of the waste stream is not be possible in many single column nitrogen generators because the waste stream is used for refrigeration purposes. Conventionally, after the waste stream is partially warmed to an intermediate temperature, between the warm and cold ends of the main heat exchanger, it is expanded with the performance of work to a low pressure to provide refrigeration. Therefore, it is not usable for purposes of repressurizing the prepurification unit.

In the prior art, roughly 4% of the electrical energy that is expended compressing the air is utilized for bed re-pressurization. The present invention has been calculated to decrease the energy expenditure by about 2%. Furthermore, since the compressor does not have to be sized to have an additional capacity to backfill the adsorbent beds, smaller and thus, less expensive compressors can be used.

BRIEF DESCRIPTION OF THE DRAWINGS

While the specification concludes with claims distinctly pointing out the subject matter that Applicants' regard as their invention, it is believed the invention will be better understood when taken in connection with the accompanying drawings in which:

FIG. 2 is a schematic view of a pre-purification unit in accordance with the present invention.

DETAILED DESCRIPTION

Figure 1:
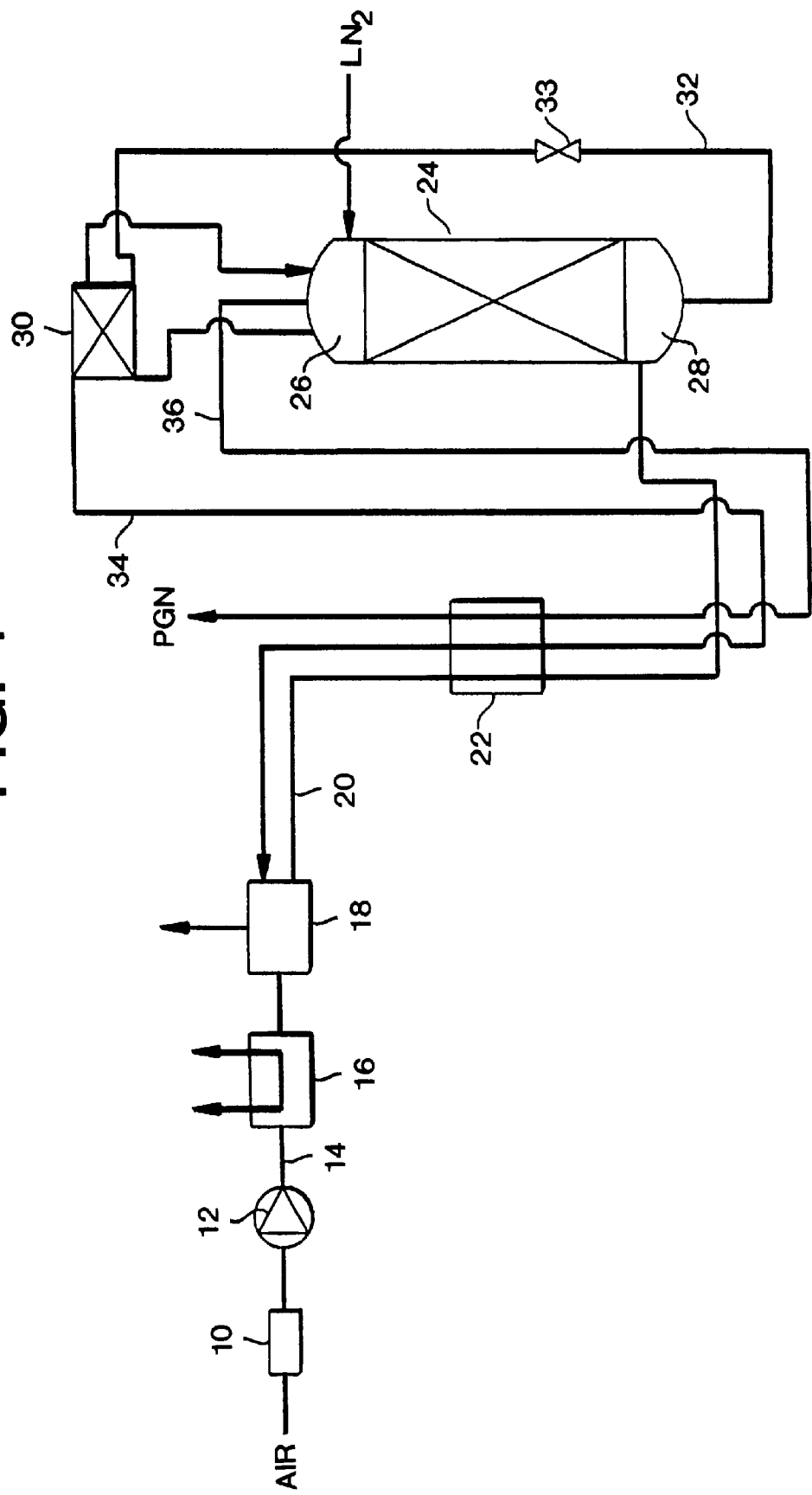
FIG. 1 is a schematic view of an air separation plant in accordance with the present invention.

With reference to FIG. 1, an air separation plant 1 in accordance with the present invention is illustrated.

In operation of air separation plant 1, air, after having been filtered in a filter 10 is compressed in compressor 12 to produce a compressed air stream 14. After the heat of compression is removed in an aftercooler 16, the air is purified in a prepurification unit 18 to remove impurities such as carbon dioxide and moisture. The resultant treated stream is a compressed and purified air stream 20.

Compressed and purified air stream 20 is cooled in a main heat exchanger 22 to a temperature suitable for its rectification. A stream 22, formed from the compressed and purified air stream 20, is then introduced into a distillation column 24 that is designed to produce a nitrogen rich tower overhead in a tower overhead region 26 and an oxygen rich liquid column bottoms within a column bottoms region 28.

Distillation column 24 is refluxed by condensing tower overhead within a head condenser 30. The coolant for the head condenser is produced by removing a coolant steam 32 from column bottoms region 28 and expanding coolant stream 32 through an expansion valve 33. After introduction into head condenser 30, coolant stream 32 vaporizes to produce a waste stream 34 enriched in oxygen which is then fed into a main heat exchanger 22 and, as will be discussed, is utilized within prepurification unit 18. A nitrogen product stream 36 is taken from tower overhead region 26 and is fully warmed within main heat exchanger 22 to produce a gaseous product labeled "PGN".

With additional reference to FIG. 2, pre-purification unit 18 is illustrated in some detail. Prepurification unit 18 consists of an inlet manifold 38 through which compressed air stream 14 enters, after having had its heat of compression removed by aftercooler unit 16. Compressed and purified air is discharged from product manifold 40. Waste stream 34 is admitted to pre-purification unit 18 through a waste stream manifold 42. In the illustrated embodiment, two adsorbent beds 44 and 46 are provided that can contain an activated alumina adsorbent of sufficient quantity for the size of air separation plant. A pressure vessel 48, that does not contain any adsorbent, is also provided.

The following, chart illustrates the operation of the pre-purification unit 18:

| Step No. | Adsorbent Bed 44 | Adsorbent bed 46 | Pressure Vessel 48 | Duration (seconds) |
|---|---|---|---|---|
| 1 | Pressurize | Adsorption | Hold | 300 |
| 2 | Adsorption | Depressurize | Pressurize | 50 |
| 3 | Adsorption | Regeneration | Pressurize | 355 |
| 4 | Adsorption | Back-Fill | Pressurize | 30 |
| 5 | Adsorption | Pressurize/Equalize | Equalize | 30 |
| 6 | Adsorption | Pressurize | Hold | 300 |
| 7 | Depressurize | Adsorption | Pressurize | 50 |
| 8 | Regeneration | Adsorption | Pressurize | 355 |
| 9 | Back-Fill | Adsorption | Pressurize | 30 |
| 10 | Pressurize/Equalize | Adsorption | Equalize | 30 |

In the following discussion, all valves are assumed to be in a normally closed position.

Turning first to step 1, valve 50 is closed while valve 52 is opened. The impurities are adsorbed within adsorbent bed 46 and are then discharged to product manifold 40. At the same time, valve 54 is being ramp opened to pressurize bed 44. The backflow of air is prevented from entering oxygen rich waste stream manifold 42 by means of check valves 56 and 58. Pressure vessel 48 is in a hold mode and as such, has not been pressurized. Check valves 60 and 61 are provided for same purpose and when adsorbent bed 46 is pressurized.

At the conclusion of step 1, adsorbent bed 44 has been regenerated and pressurized and thus is ready to adsorb while adsorbent bed 46 is now set to be regenerated. To this end, step 2 is initiated by opening valve 62 and closing valve 54. This causes pressure from adsorbent bed 46 to vent through atmospheric vent 64. A small portion of a prepurification unit product stream produced from adsorbent bed 44 is diverted to pressure vessel 48 by opening valve 66. In this regard, in order to bring adsorbent bed 44 on-line, valve 50 is opened and valve 52 is closed.

In step 3, adsorbent bed 46 is purged with oxygen rich waste originating from waste stream 34. At this point, valve 62 closes, valve 68 opens; and a valve 70 also opens to admit the oxygen rich waste into adsorbent bed 46. The dry oxygen rich waste regenerates adsorbent bed 46 by driving out the previously adsorbed moisture and carbon dioxide and discharging the same through atmospheric vent 64.

During step 4, adsorbent bed 46 is partly repressurized or backfilled with oxygen rich waste stream by fully opening valve 70 while closing valve 68.

The fifth step is a pressure equalization step in which valves 54, 66 and 70 close and valve 72 opens. The effect of this is to pressure equalize adsorbent bed 46 with pressure vessel 48 to bring adsorbent bed 46 back up to operating pressure.

In step 6, valve 72 is closed and is reopened so that adsorbent bed 46 is repressurized back up to the operational pressure of the pre-purification unit.

In step 7, adsorbent bed 46 is brought online while adsorbent bed 44 is brought off-line so as to be regenerated. Pressure vessel 48 is re-pressurized. To such end, valve 50 is closed and valve 52 is now opened. Valve 74 opens to allow bed 44 to depressurize through atmospheric vent 64. Valve 72 closes and valve 76 opens to allow part of the compressed and purified air produced by adsorbent bed 46 to repressurize pressure vessel 48. At this point, valve 66 is closed and valve 54 is closed.

In step 8, adsorbent bed 44 is now purged with oxygen rich waste by opening valve 70 and valve 78 and closing valve 74. Desorbed impurities such as carbon dioxide and moisture are discharged through atmospheric vent 64.

In step 9, adsorbent bed 44 is partly repressurized by being backfilled with oxygen rich waste. To this end, valve 78 is closed with valve 70 open. In step is closed order to bring adsorbent bed 44 back on-line and up to operating pressure, valves 70 and 76 are closed. Valve 80 is opened to pressurize equalize the pressure vessel 48 with adsorbent bed 44. In step 1 valve 54 is opened to complete the pressurization of adsorbent bed 44.

From the foregoing description, it can be seen that pressure vessel 48 acts as a bed to equalize pressure but does not contain expensive adsorbent. As can be appreciated, pressure vessel 48 could be filled with adsorbent and act as a producing bed while being again partially re-pressurized with part of the waste stream. Moreover, the use of pressure vessel 48 in lieu of the adsorbent beds for pressure equalization acts to stabilize production.

As can be appreciated by those skilled in the art, the foregoing operation could be controlled by a programmable device remotely controlling all of the aforementioned valves. While this present invention has been described with reference to a preferred embodiment, as will occur to those skilled in the art numerous changes, additions and omissions may be made without departing from the spirit and scope of the present invention.

We claim:

1. A method of separating nitrogen from air comprising:
    compressing the air to form an air stream and removing heat of compression from said air stream;
    purifying said air stream by removing impurities comprising carbon dioxide and moisture from said air stream to produce a compressed and purified air stream;

introducing said compressed and purified air stream into a distillation column configured to separate the air to produce the nitrogen and a waste stream enriched in oxygen; and introducing refrigeration from an external liquid source;

the air stream being purified in a pre-purification unit having at least two adsorbent beds containing an adsorbent to adsorb said impurities, the pre-purification unit being operated by subjecting each of said at least two adsorbent beds to adsorption to adsorb said impurities from said air stream, thereby to produce a prepurification unit product stream, followed by regeneration to regenerate said adsorbent and to repressurize each of said at least two adsorbent beds to an operational pressure of said pre-purification unit;

the compressed and purified air stream being formed from at least a part of the prepurification unit product stream; and each of the two beds being in part repressurized with said waste stream.

2. The method of claim 1, wherein:

the pre-purification unit also has a pressure vessel; and said regeneration of each of said two beds is conducted in accordance with a cycle having depressurization, purge, back-fill, pressure equalization, and pressurization stages;

the depressurization stage being conducted by depressurizing each of said two beds through an inlet section thereof, the purge stage being conducted by introducing said waste stream into an outlet region of said bed to drive preferentially adsorbed components from inlet sections thereof; the back-fill stage being conducted by introducing said waste stream into each of said two beds so that each of said two beds partly pressurize; the pressure equalization steps being conducted by equalizing pressure of each of said beds with said pressure vessel and such that each of said beds further pressurize; and said pressurization step being conducted by introducing a remaining part of said prepurification unit product stream into each of said beds and such that each of said beds reach said operational pressure.

3. The method of claim 2, wherein:

during said depressurization, purge and back-fill stages said compressed and purified air stream is formed from part of said prepurification unit product stream and said remaining part of said prepurification unit product stream is introduced into said pressure vessel; and during said pressure equalization stage said compressed and purified air stream is formed from all of said prepurification unit product stream.

4. The method of claim 1, wherein said refrigeration is added by injecting liquid nitrogen into said distillation column.

5. The method of claim 4, wherein:

the pre-purification unit also has a pressure vessel; and said regeneration of each of said two beds is conducted in accordance with a cycle having depressurization, purge, back-fill, pressure equalization, and pressurization stages;

the depressurization stage being conducted by depressurizing each of said two beds through an inlet section thereof, the purge stage being conducted by introducing said waste stream into an outlet region of said bed to drive preferentially adsorbed components from inlet sections thereof; the back-fill stage being conducted by introducing said waste stream into each of said two beds so that each of said two beds partly pressurize; the pressure equalization steps being conducted by equalizing pressure of each of said beds with said pressure vessel and such that each of said beds further pressurize; and said pressurization step being conducted by introducing a remaining part of said prepurification unit product stream into each of said beds and such that each of said beds reach said operational pressure.

6. The method of claim 5, wherein:

during said depressurization, purge and back-fill stages said compressed and purified air stream is formed from part of said prepurification unit product stream and said remaining part of said prepurification unit product stream is introduced into said pressure vessel; and during said pressure equalization stage said compressed and purified air stream is formed from all of said prepurification unit product stream.

* * * * *